A. JENSEN.
TOBACCO PIPE.
APPLICATION FILED JULY 24, 1917.

1,288,012.

Patented Dec. 17, 1918.

WITNESSES

INVENTOR
Aage Jensen
BY Victor J. Evans
ATTORNEY

UNITED STATES PATENT OFFICE.

AAGE JENSEN, OF PHILLIPS, WISCONSIN.

TOBACCO-PIPE.

1,288,012.

Specification of Letters Patent.　Patented Dec. 17, 1918.

Application filed July 24, 1917.　Serial No. 182,463.

*To all whom it may concern:*

Be it known that I, AAGE JENSEN, a citizen of the United States, residing at Phillips, in the county of Price and State of Wisconsin, have invented new and useful Improvements in Tobacco-Pipes, of which the following is a specification.

This invention relates to improvements in smokers' pipes.

The object of the invention is to provide a pipe in which clogging of the same is prevented and in which the juices will be collected in a removable receptable located in the bottom of the bowl and in communication therewith and with the stem.

A further object of the invention is to provide openings with guard flanges to form a trap, so that the contents of the removable receptacle will be prevented from entering either the bowl or the stem, a sufficient number of openings being provided for communication between the receptacle and bowl, so that in event of some of them becoming clogged, the proper draft will not be interfered with.

A still further object of the invention is the provision of a central cooling chamber arranged within the removable receptacle and in communication with the atmosphere, to reduce the heat of the pipe and to provide a cool, sweet smoke.

With the above and other objects in view, the invention consists of the following novel combination and arrangement of parts, hereinafter more fully described and illustrated in the accompanying drawings, in which—

Referring to the drawings, like characters of reference indicate corresponding parts throughout the several views.

Figure 1:
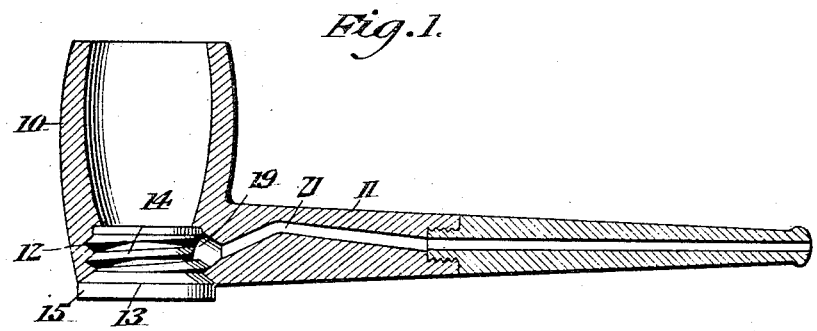
Figure 1 is a central longitudinal sectional view of a pipe constructed in accordance with the present invention.
Figure 2:
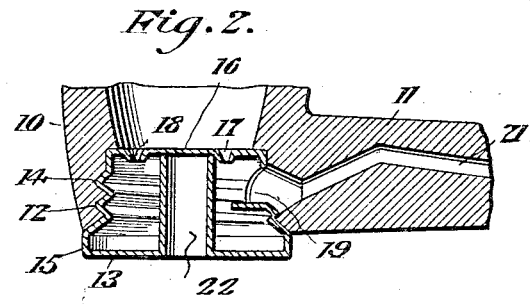
Fig. 2 is an enlarged sectional view through the lower portion of the bowl and the contiguous portion of the stem, with the invention in position therein.
Figure 3:
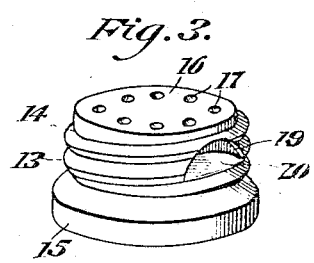
Fig. 3 is a detailed perspective view of the receptacle removed from the pipe.

The pipe shown is of any suitable form or material and includes a bowl 10 and a stem 11. The bottom of the bowl is formed with a threaded opening 12 within which is removably positioned the receptacle 13, which is designed to receive and retain the juices from the bowl and stem to prevent the said juices from returning thereto, irrespective of the position in which the pipe is placed. In order to removably position the receptacle within the opening 12, the said receptacle is formed with threads 14, which engage with the threads in the said opening and the said receptacle is further provided with an enlarged portion, 15, which is designed to project beyond the bottom of the opening 12 to provide a finger hold by which the receptacle may be conveniently removed or positioned.

The upper wall 16 of the receptacle is formed with a plurality of openings 17, which are provided with downwardly extending surrounding flanges 18 to form a trap and to prevent the entrance into the bowl of the contents of the receptacle. Formed within the side wall of the receptacle 13 is a preferably semi-circular opening 19, which is formed by punching inwardly the material cut from the said opening to provide an inwardly extending retaining flange 20, which prevents the contents of the said receptacle from being drawn into the opening 21, with which the stem is provided. This opening 21 is so arranged that the opening 19 of the receptacle may be brought into register therewith, that portion of the opening 21 adjacent the receptacle being angularly and forwardly disposed, so that should the fine particles of tobacco be drawn into the receptacle through the openings 17 the inclination of the opening 21 at this point would further act to retard the drawing of these particles into the stem.

Located within the receptacle 13 and disposed centrally thereof is a cooling chamber 22, the latter comprising a cylinder opening at its lower end through the bottom wall of the receptacle, the top wall of the said receptacle forming a closure for the opposite end of the cylinder. As this cylinder is open to the atmosphere at its lower end it provides a contacting passage for the heat from the bowl of the pipe and permits the outside air to intermingle with the heat within the passage to provide a cooling chamber.

It is believed that from the foreging description when taken in connection with the accompanying drawings, the construction and advantages of the invention will be apparent. The right is reserved to make such changes in the form and proportion thereof as will properly fall within the scope of the claim hereto appended.

Having described the invention, what is claimed is:

The combination with a pipe having a threaded opening in the bottom of the bowl, of a receptacle having its walls threaded for removable engagement with the threads of the opening, said receptacle having top and bottom walls and a cylindrical side wall, the top wall defining a bottom for the bowl of the pipe and being provided with a plurality of openings, flanges surrounding said openings and extending within the receptacle, the side wall of the receptacle being also provided with an opening to establish communication between the interior of the receptacle and the pipe stem, a flange extending inwardly from the last mentioned opening and a centrally disposed cylinder extending through the receptacle from the top to the bottom wall, the said cylinder defining a cooling chamber and being open at its bottom.

In testimony whereof I affix my signature.

AAGE JENSEN.

Copies of this patent may be obtained for five cents each, by addressing the "Commissioner of Patents, Washington, D. C."